Figure 5:
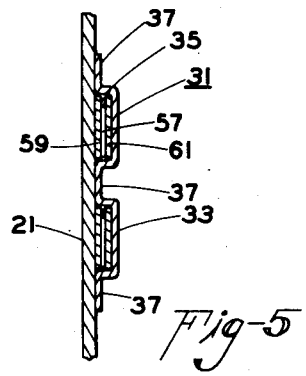

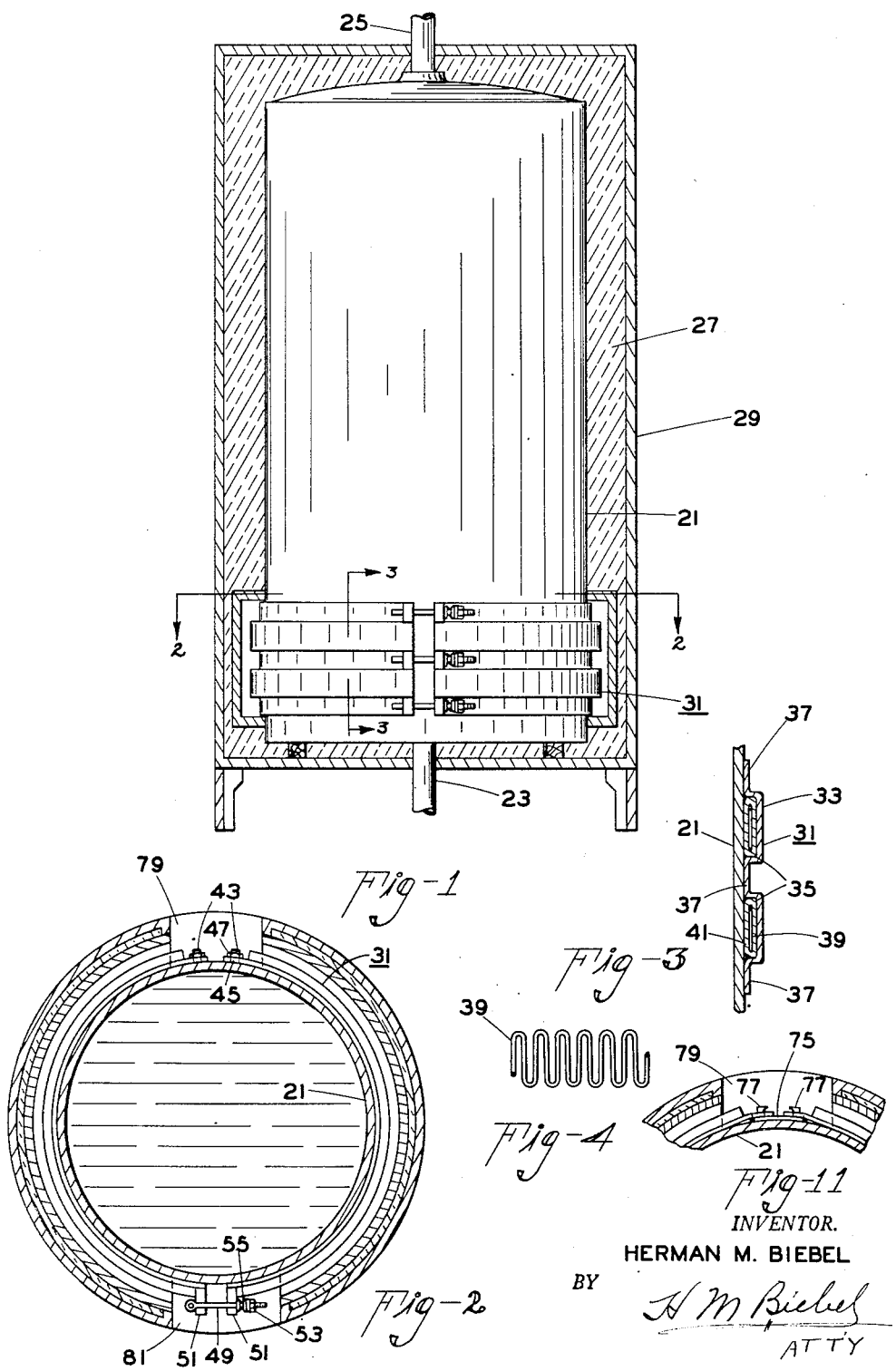

June 6, 1950          H. M. BIEBEL          2,510,456
WATER HEATER

Filed June 26, 1947          2 Sheets-Sheet 2

INVENTOR.
HERMAN M. BIEBEL
BY
H. M. Biebel
ATT'Y

Patented June 6, 1950

2,510,456

UNITED STATES PATENT OFFICE 2,510,456

WATER HEATER

Herman M. Biebel, Elgin, Ill., assignor to McGraw Electric Company, Elgin, Ill., a corporation of Delaware Application June 26, 1947, Serial No. 757,293

3 Claims. (Cl. 219—38)

My invention relates to water heaters and particularly to clamp-on water heaters.

One object of my invention is to provide a novel form of electric heater for domestic hot water tanks.

Another object of my invention is to provide a heating means for heating water in a tank that shall embody means for reducing the watts per square inch of heat transferred.

Another object of my invention is to provide a relatively simple, inexpensive and highly efficient electric heater for hot water tanks.

Another object of my invention is to provide a clamp-on heater having a minimum thickness of electric insulation therein.

Other objects of my invention will either be apparent from a description of several forms of device embodying my invention or will be set out in the course of such description and particularly in the appended claims.

Figure 6:
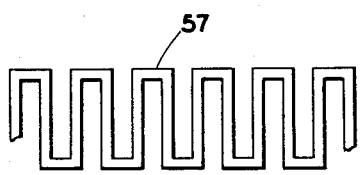
Figure 7:
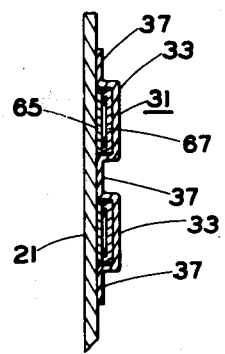
Figure 8:
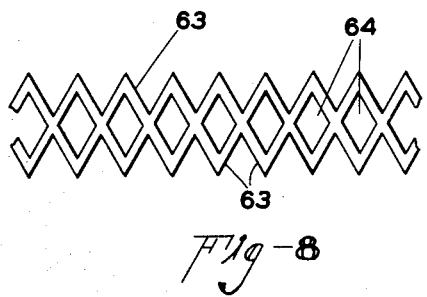
Figure 9:
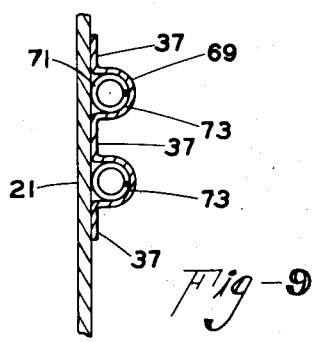
Figure 10:
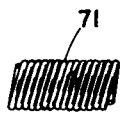

In the drawings:

Figure 1 is a view in vertical section through a tank having thereon a heater embodying my invention, Fig. 2 is a horizontal sectional view therethrough taken on the line 2—2 of Fig. 1, Fig. 3 is a fragmentary vertical sectional view taken on the line 3—3 of Fig. 1, Fig. 4 is a fragmentary view of one kind of formed resistor, Fig. 5 is a fragmentary vertical sectional view similar to Fig. 3, showing another type of resistor, Fig. 6 is a fragmentary view of another form of shaped resistor, Fig. 7 is a fragmentary vertical sectional view showing another form of electric heater, Fig. 8 is a view of still another form of resistor, Fig. 9 is a fragmentary vertical sectional view of another form of heater, Fig. 10 is a fragmentary view of another form of resistor, and, Fig. 11 is a fragmentary top plan view showing another means for holding the heating units.

Referring first of all to Figs. 1 to 4, I have there shown, particularly in Figs. 1 and 2, an ordinary domestic hot water tank 21 that is provided with a lower cold water inlet pipe 23 and an upper hot water outlet pipe 25. A mass of heat insulation, such as mineral wool 27, is positioned around the tank 21 and may be held in proper operative position thereon by an outer casing 29.

An electric heater 31 embodying my invention is adapted to be positioned in a tunnel on the tank 21 and in case only a single electric heater is used I prefer to locate it adjacent the lower end of the tank. However, I do not desire to be limited to the use of only a single heater since I may use an upper heater as well.

The heater 31 embodies a shroud 33 preferably made of aluminum, having two inner grooves 35 as well as a plurality of side portions 37, which side portions are adapted to be maintained in close operative engagement with the outside surface of tank 21 by means to be hereinafter described. The shroud 33 is of arcuate shape in longitudinal section and preferably is substantially semi-circular in length. A resistor member 39 is shown in shaped form in Fig. 4 from which it may be noted that the resistor member 39 comprises wire which has been bent to comprise a number of substantially straight convolutions extending substantially at right angles to the length of the resistor, the adjacent convolutions being connected by return-bent end portions.

Each of the two grooves 35 is provided with one of the resistor members 39 which resistor members are preferably enclosed in a flattened metallic tube, which tube comprises highly heat-conducting metal such as brass, copper or aluminum, having a thickness of .015".

While I may use brass or copper I prefer to use aluminum for not only the shroud 33 but also for the protecting flattened tube 41 as well as for the conductor 39. The thickness of the flattened tube 41 is made such that the inner surface of the groove will tend to clamp it tightly against the outer surface of the tank 21, substantially the same pressure being brought to bear upon tube 41 as is brought to bear upon the side portions 37.

The resistor member 39 may have provided on its entire outer surface an integral, inorganic, high-temperature-resisting, heat-conducting and electric-insulating anodic coating, which coating may be produced thereon by any one of a number of different methods, one of which is described and covered in U. S. Patent #1,526,127, particularly when these parts are made of aluminum. I do not desire to be limited to the use of aluminum since substantially the same type of electric-insulating coating may be produced on other metals. The thickness of this anodic coating may be about .001" or less and while I do not desire to be limited thereto I may make the thickness of the shroud 33 about .035" to .060".

In order to hold these shrouds in close position against the outside of the tank 21 I provide a pair of projections 43 which are positioned relatively close together at one point on the outer peripheral surface of tank 21. An opening is provided in each of the side portions 37 of the shroud, there being three such openings 45 provided so that the rear end of each shroud 31 may be caught upon the projections 43. Nuts 47 may be engaged with the projections 43 in order that the inner surface of the shroud 33 may be tightly clamped against the outer surface of the tank 21 as by the use of a clamping bolt 49 extending through openings in lugs 51 secured to the side portions 37 at the front end of the tank, a nut 53 together with a spring 55 permitting of tightening the shroud 33 tightly against the outer surface of the tank 21.

Referring to Figs. 5 and 6, I have there shown another form of heater 31 embodying a shroud 33, having inner grooves 35 therein together with side portions 37. The resistor in this case embodies a preshaped conductor 57 embodying a plurality of laterally extending substantially straight convolutions connected by short straight portions which may be made by punching out a strip of resistor material. Means for increasing the insulation of the resistor 57 comprises an inner strip 59 as well as an outer strip 61 with the resistor positioned therebetween, which may be made of aluminum having an anodic coating over the entire outer surface. The resistor 57 may have an anodic coating thereon over its entire surface as hereinbefore set forth for resistor 39, while the strips 59 and 61 may also have their entire outer surfaces provided with substantially the same kind of anodic coating. The thickness of the strips 59 and 61 may be about .015" while the thickness of the shroud may vary from .035" to .06".

Referring now to Figs. 7 and 8 of the drawings, I have there shown a still further modification of a resistor member embodying my invention, this resistor comprising two connected integral zigzag portions 63 having openings 64 therebetween. The width of each of the zigzag portions may be made so as to obtain any desired resistance of the conductor in order to predetermine the amount of electrical energy which will be translated into heat. The shroud 33 may be substantially the same as has hereinbefore been described and as shown in Figs. 3 and 5, while the resistor 63 is positioned between an inner strip 65 and an outer strip 67 of channel shape substantially as shown in Fig. 7 of the drawings. I prefer to make the resistor 63, as well as the two strips 65 and 67, of aluminum, having the hereinbefore described anodic coating thereon. While it may not be necessary, to prevent grounding of the resistor, to provide an anodic coating on both the strips 65 and 67 as well as on the resistor 63, I may provide such anodic coating on both members whereby a much greater safeguard against breakdown will be provided.

Referring now to Figs. 9 and 10, I have there shown a still further modification of electric heater embodying my invention and comprising a shroud 69 having two inner grooves and side portions. Each of the two grooves in the shroud 69 is of generally circular shape in lateral section and a helically coiled resistor member 71, which may be of wire, is positioned in the groove 73. The outer diameter of the helically wound resistance conductor 71 is made such that it will be clamped tightly in the groove 73 when the shroud 69 is clamped tightly against the outer surface of the tank 21. Substantially the same comments made hereinbefore in connection with the other resistors and the strips or flattened tube, apply also to the structure shown in Figs. 9 and 10. I wish to here point out that it is possible to wind the conductor 71 so that each pair of adjacent turns will actually contact each other since the entire outer surface of the resistance conductor 71 is provided with an electric-insulating coating thereon. It is thus possible to provide more resistance for a given peripheral length of resistor than has been the case heretofore.

Referring now to Fig. 11 of the drawings, I have there shown a modification of holding means comprising a block 75, which may be of relatively strong metal, having two lugs 77 secured thereto and projecting radially outwardly therefrom. Each of the lugs 77 is of hook shape so that an opening in the side part of the shroud 31 or 69 may engage one of the lugs 77.

In the assembly of the heating member 31 on the tank it is only necessary to locate the member 75 in the proper operative position at an opening 79 in the heat insulation and then move one of the arcuate shrouds 31 or 69 from the front opening 81 through the tunnel in the heat insulation until the rear end can be hooked over the hook 77. Then the other heater is moved into position, hooked over the other lug 77, and the bolt 49 is then applied, the nut 53 being tightened on bolt 49 until both of the arcuate heaters, particularly the shroud 31 or 69, are clamped tightly against the outer surface of the periphery of the tank 21. While I have shown block 75 welded against tank 21, this is not necessary as it will work just as well if it is not held in a fixed position since bolt 49 will hold shrouds 31 as well as block 75 in proper operative position.

The device embodying my invention thus provides a relatively simple, inexpensive, easily manufactured and assembled heater of the clamp-on type for a tank, which heater may be easily and quickly installed in proper desired operative position on a tank. The use of the side portions of the shrouds 31 or 69 in close engagement with the outside surface of a tank for the return of heat provides a large heat-flow path giving a relatively low number of watts per square inch traversing said path and flowing from the resistor to the tank surface. The fact that the thickness of the insulation is only about .001" and that the thickness of the walls of the flattened tube or the thickness of the strips is about .015" means that not only is the amount of material of the heating unit relatively small but also that the distance through which heat must travel from the resistor to the fluid within the tank is relatively very small and therefore the temperature differential existing between the temperature of the resistor and the temperature of the water being heated is also relatively very small.

While I have shown a heater having two grooves, I do not desire to be limited thereto, since only one groove may also be used, particularly on low-wattage heaters.

Various modifications may be made in the device embodying my invention without departing from the spirit and scope thereof and I desire that all such modifications coming clearly within the scope of the appended claims shall be considered a part of my invention.

I claim as my invention:

1. A heater adapted to be inserted in a tunnel around a water tank having curved walls, said heater to be inserted through an opening therein and therein to be fastened to said tank, comprising at least two elongated, heater sections, each section having means at one end for engaging a supporting projection on the tank and means at the other end for fastening it to another section for drawing it taut around the curve of the tank.

2. In an electric heating unit adapted to be mounted against the outside surface of a hot-water tank, a channel-shaped member of arcuate shape one end of which is adapted to engage a projection on the tank, means for fastening the other end of said channel to a similar end of a second similar channel member for drawing it taut against the convex surface of the tank, and a resistor in said channel.

3. The combination of the immediately preceding claim wherein the length of said channel is approximately half the circumference of the tank.

HERMAN M. BIEBEL.

REFERENCES CITED

The following references are of record in the file of this patent:

UNITED STATES PATENTS

| Number | Name | Date |
|---|---|---|
| 1,704,413 | Wait | Mar. 5, 1929 |
| 2,367,368 | Osterheld | Jan. 16, 1945 |
| 2,423,488 | Dowe | July 8, 1947 |